United States Patent
Tsvetkov et al.

(10) Patent No.: US 10,936,433 B1
(45) Date of Patent: Mar. 2, 2021

(54) SYSTEMS AND METHODS FOR BACKUP OF COMPUTING SYSTEMS

(71) Applicant: Acronis International GmBh, Shaffhausen (CH)

(72) Inventors: Anton Tsvetkov, Moscow (RU); Stanislav Protasov, Moscow (RU); Serguei Beloussov, Costa del Sol (SG)

(73) Assignee: ACRONIS INTERNATIONAL GMBH

( * ) Notice: Subject to any disclaimer, the term of this patent is extended or adjusted under 35 U.S.C. 154(b) by 222 days.

(21) Appl. No.: 14/984,159

(22) Filed: Dec. 30, 2015

Related U.S. Application Data

(60) Provisional application No. 62/097,772, filed on Dec. 30, 2014, provisional application No. 62/097,798, filed on Dec. 30, 2014.

(51) Int. Cl.
*G06F 16/00* (2019.01)
*G06F 11/14* (2006.01)

(52) U.S. Cl.
CPC ...... *G06F 11/1461* (2013.01); *G06F 2201/80* (2013.01)

(58) Field of Classification Search
CPC .................................................. G06F 11/1458
See application file for complete search history.

(56) References Cited

U.S. PATENT DOCUMENTS

| | | |
|---|---|---|
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |

(Continued)

OTHER PUBLICATIONS

Purplemath, "Finding the Next Number in a Sequence", <http://www.purplemath.com/modules/nextnumb.htm> (Year: 2012).*

*Primary Examiner* — Hung Q Pham
(74) *Attorney, Agent, or Firm* — K&L Gates LLP

(57) ABSTRACT

Systems and methods for monitoring backup performance of a computing device are described. In one aspect, the disclosure relates to automatic transparent load-balancing such that there is no or substantially no user involvement and resource usage is optimized. In one aspect, the disclosure relates to customization of backup destination by user using scripting such that backups can be distributed by a rule to different locations or it can use local for agent configuration to resolve backup performance degradation issues.

14 Claims, 5 Drawing Sheets

(56) References Cited

U.S. PATENT DOCUMENTS

| | | |
|---|---|---|
| 8,005,797 B1 | 8/2011 | Chepel et al. |
| 8,046,632 B2 * | 10/2011 | Miwa ................ G06F 11/1456 707/634 |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,117,492 B1 * | 2/2012 | Searls ................ G06F 11/1458 707/654 |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 9,798,629 B1 * | 10/2017 | Shilane ............... G06F 11/1466 |
| 2006/0225065 A1 | 10/2006 | Chandhok et al. |
| 2008/0016123 A1 * | 1/2008 | Devraj ................. G06F 16/217 |
| 2009/0030955 A1 * | 1/2009 | Brunet ................ G06F 11/1456 |
| 2010/0011178 A1 | 1/2010 | Feathergill |

* cited by examiner

SYSTEMS AND METHODS FOR BACKUP OF COMPUTING SYSTEMS

CROSS-REFERENCE TO RELATED APPLICATIONS

This application claims priority to and the benefit of U.S. Provisional Patent Application No. 62/097,772 filed on Dec. 30, 2014, and U.S. Provisional Patent Application No. 62/097,798, filed on Dec. 30, 2014, the disclosures of which are herein incorporated by reference in their entirety.

TECHNICAL FIELD

The technical field may generally relate to a computer system backup, and measurement of backup performance and designation of backup data storage location.

BACKGROUND

Currently, there are a number of methods of data archiving. One of these is a backup of the entire hard drive, which typically involves copying of the hard drive content onto some other medium, such as another hard disk drive, a DVD ROM, a DVD RAM, a flash disk, etc. Another approach is often referred to as "incremental backup," which generally decreases the amount of space required for the archiving. With the incremental backup, typically the contents of the hard disk drive are archived, or stored somewhere once. After that, only that data that has been changed, or added, since the previous backup, or since the pervious incremental backup, is actually archived.

With respect to certain types of computing systems, such as email related systems and software, additional challenges arise relating to backups. For example, given the volume of transactions, challenges arise with respect to backing up the data in these types systems. Such systems record every operation applied to the database records. These operations can be stored in files which can become voluminous over time. Performing a backup of a computing system, especially one with a large amount of data can result in long delays and downtime as part of a restore or archive operation with respect to such a system.

With any type of data archiving, the backup methods that are used to perform them have varying degrees of efficiency depending on a number of factors, including the state of the computing system during the backup and the volume of files to be backed up. The backup of a system is usually performed without any knowledge of the efficiency of the process or if the backup process and its performance are degrading over time. This can ultimately result in a slowdown of the subsequent system backups with the issues causing the slowdown left unresolved.

In addition, there are can be issues involving the location for storing the data generated from a backup process. In most systems, a single backup location is specified for storing back up data, resulting in the inability to customize the path where the backup data is stored. While it may be possible to move the backup data from the single location after the backup data has been stored therein, this requires additional processing and resource consumption.

Accordingly, there is a need for an effective and efficient method of determining performance degradation of a system backup of a computing system and for determining the backup data storage location.

BRIEF SUMMARY

In part, the disclosure relates to systems and methods suitable for resolving backup performance degradation for users with distributed environment containing many machines. The systems and methods implement one or more types of performance surveillance via a surveillance module which can be implemented in hardware, software or combinations thereof. Using a backup performance surveillance system can prevent a user encountering a scenario in which the backup maintenance window will not be long enough for creating any required backups and it will negatively affect the backed up system during production hours or other active periods of use. In part, the implementations described herein predict how or when backup performance will degrade in the context of system users creating backups. With the embodiments described herein, a user can create backup and have it successfully complete without having to experience degradation in the system being backed up.

In one embodiment, the disclosure relates to systems and methods that can be implemented with regard to one or more of a backup system, a backup job, a surveillance system monitor, a collection for the measured performance data, and an issues resolution center.

In one embodiment, the disclosure relates to backup performance system for a surveillance and load distribution application that includes one or more computing devices configured to execute a backup job for saving data to a backup storage system; and a backup management system in electronic communication with the one or more computing devices and configured to set up backup jobs, the backup management system including a surveillance monitor configured to measure and compare performance data of a plurality of backup jobs for the detection and correction of a performance degradation.

In one embodiment, the performance data is stored in a database in the backup management system. In one embodiment, the surveillance monitor measures performance of an initial backup job and stores the performance data from the initial backup job to a performance database. In one embodiment, the surveillance monitor measures performance data of a subsequent backup job and compares the performance data of the subsequent backup job to the performance data of the initial backup job. In one embodiment, the surveillance monitor communicates with a resolution center if the surveillance monitor detects a performance degradation between the initial backup job performance data and the subsequent backup job performance data.

In one embodiment, the surveillance monitor detects a performance degradation when the time to complete the subsequent backup job compared to the time to complete the initial backup job is greater than a predetermined threshold.

In one embodiment, the system further includes a resolution center configured to solve the performance degradation. In one embodiment, the resolution center is configured to solve the performance degradation. In one embodiment, the resolution center is configured to notify a user of the computing device of the performance degradation.

In one embodiment, the disclosure relates to method for backup performance surveillance, the method includes executing a backup job of a computing device and storing backup data in a database; measuring performance of the backup job and storing performance data regarding the backup job; and comparing the performance data from the backup job to performance data of a previous backup job in order to detect a degradation in performance of the backup job.

In part, the disclosure relates to systems and methods suitable for resolving backup performance degradation for users with distributed environment containing many machines. The systems and methods implement one or more types of performance surveillance via a surveillance module which can be implemented in hardware, software or combinations thereof. Using a backup performance surveillance system can prevent a user encountering a scenario in which the backup maintenance window will not be long enough for creating any required backups and it will negatively affect the backed up system during production hours or other active periods of use.

In one aspect, the disclosure relates to automatic transparent load-balancing such that there is no or substantially no user involvement and resource usage is optimized. In one aspect, the disclosure relates to customization of backup destination by user using scripting such that backups can be distributed by a rule to different locations or it can use local for agent configuration to resolve backup performance degradation issues.

In part, the implementations described herein predict how or when backup performance will degrade in the context of system users creating backups. With the embodiments described herein, a user can create backup and have it successfully complete without having to experience degradation in the system being backed up.

In one embodiment, the disclosure relates to systems and methods that can be implemented with regard to one or more of a backup system, a backup job, a surveillance system monitor, a collection for the measured performance data, and an issues resolution center.

In one embodiment, the disclosure relates to backup management system that may include one or more computing devices configured to execute a backup job for saving data to one of a plurality of database locations; and a backup management system in electronic communication with the one or more computing devices and the plurality of database locations, the backup management system being configured to schedule backup jobs and specify the one of the plurality of database locations to which the data from the backup job is stored.

In one embodiment, the backup management system includes a management server that is configured to generate a backup plan having a set of rules that specify how the data from the backup job will be generated and stored. In one embodiment, the backup plan includes the type of data from the computing device to be backed up and the one of the plurality of database locations to which the data is stored.

In one embodiment, the backup management system is configured to create one or more scripts for each computing device that designates the one of the plurality of database locations. In one embodiment, the script is configured to calculate a destination path for the data from the backup such that the data is stored in one of the plurality of database locations and to provide the destination path to a backup application of the computing device. In one embodiment, the script is executed on the computing device prior to the start of the backup. In one embodiment, the script uses current information including but not limited to date or machine properties to define the destination path. In one embodiment, the data from the backups are written to the destination path as calculated by the script. In one embodiment, the script generated can be different for each backup of the computing device such that the data from various backups of the computing device can be stored at different locations.

DETAILED DESCRIPTION

A user may institute backup procedures to ensure persistence of applications, data, or other resources accessed through one or more machines such as computing devices. In one embodiment, the machine can be a virtual machine. Each machine or computing device, whether physical or virtual can run applications such as databases, log file generators, and other system components. In part, the disclosure relates to methods of backing up such applications, files and other data stored on or otherwise used by such machines and measuring the performance of the backup procedure. For example, a backup archive of a machine may be created and stored onsite or offsite and may include the entire content of the physical or virtual machine before it failed. The backup process be can time-consuming depending on the number of logs files that exist that need to be restored as entries in one or more databases and can degrade over time due to a variety of factors.

Figure 2:
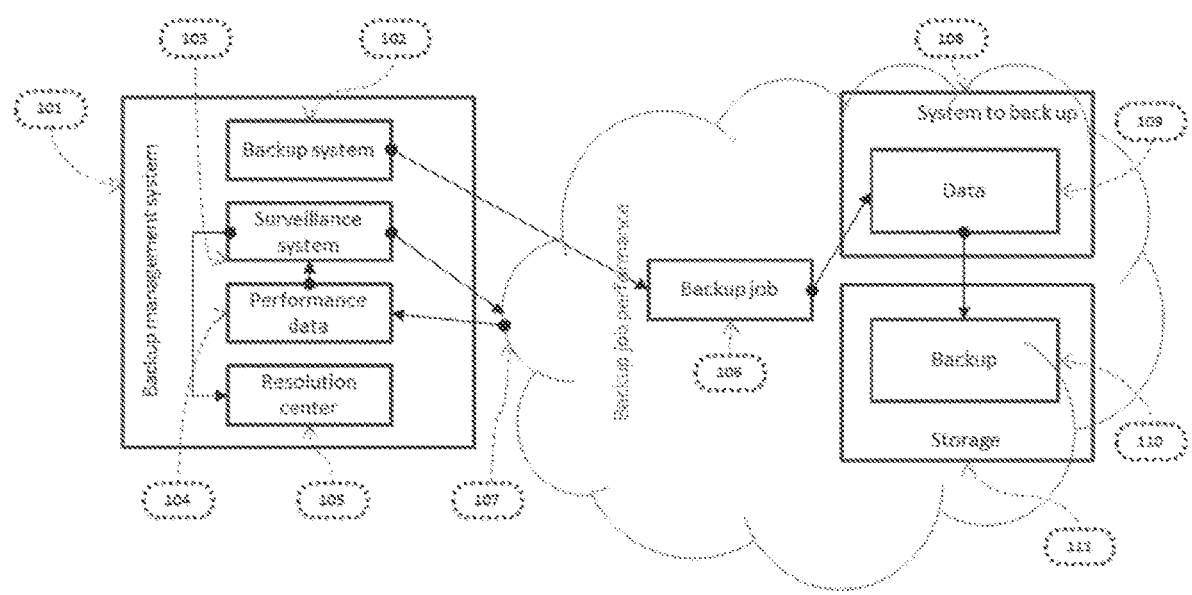
FIG. 2 depicts an example of a backup management system in accordance with the present disclosure.

In view of the forgoing, there is a need for a system in which the degradation of the backup process can be measured and/or resolved. Referring to FIG. 2, there is shown a backup management system 101. The system includes functionality to allow it to determine if there is degradation in performance of a backup process performed on a computing device. Various factors can cause a degradation of backup performance, including but not limited to backup time that has increased since an initial or previous system backup, multiple backups being performed simultaneously or overlapping in some way to slow down backup time, additional tasks or system maintenance being performed by a computing device or operating system during the time a backup is being performed, a slow network sleep, or a slowdown of storage writing speed.

Figure 1:
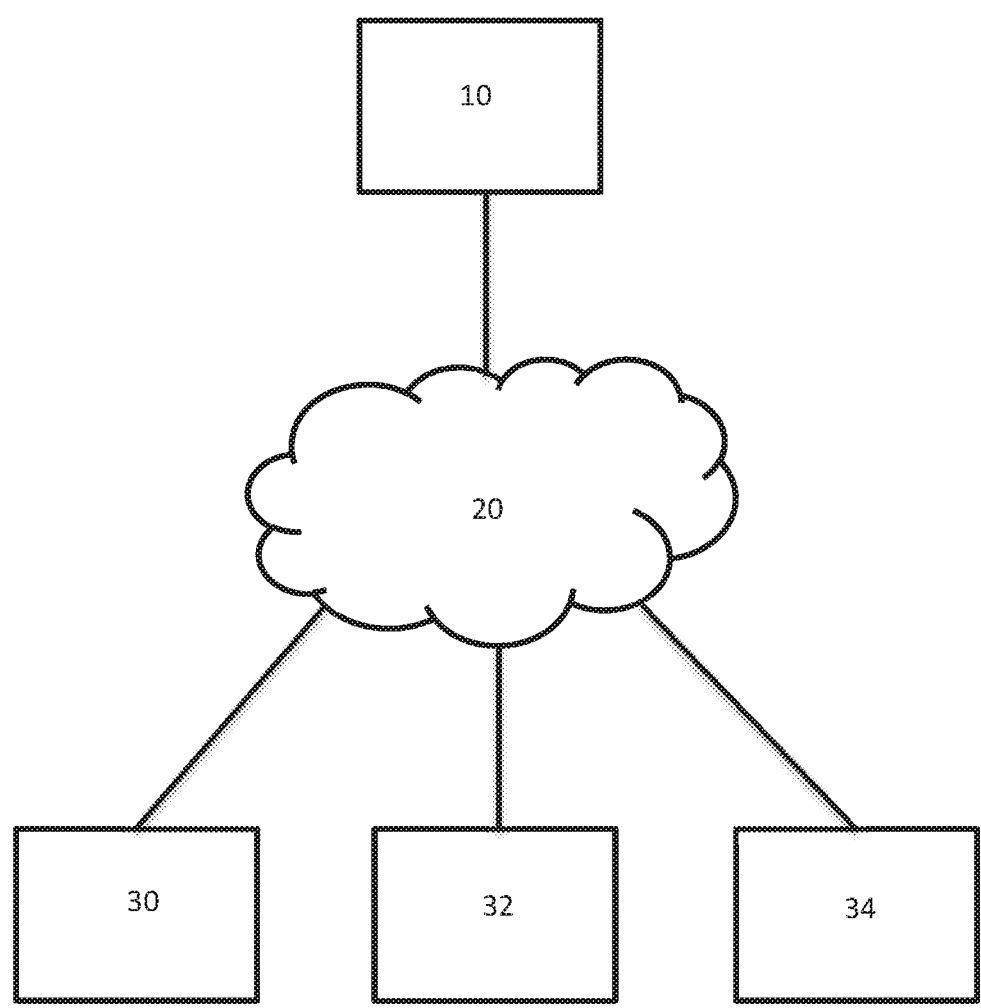
FIG. 1 depicts an example system that can execute implementations of the present disclosure.

Referring to FIG. 1, a backup management system may reside on and may be executed by a computing device 10, which may be in communication with network 20 (e.g., the Internet or a local area network). Examples of a computing device 10 may include, but are not limited to: a personal computer, a server computer, a series of server computers, a mini computer, and/or a mainframe computer. The computer 10 may be a distributed system and the operations of computer 10 may execute on one or more processors, simultaneously and/or serially. For example, computer 10 may be a symbolic representation of a cloud computing site, cloud environment, or cloud platform running multiple servers, computers, or virtual machines (e.g., a virtual machine host computer). Computer 10 may execute one or more operating systems, examples of which may include but are not limited to: Microsoft Windows Server™; Novell Netware™; Redhat Linux™, Unix, or a custom operating system, for example.

Computing devices 30, 32, 34 may communicate with the backup management system directly through the device on backup management process is executed, or through a network 20. The various computing device may be directly or indirectly coupled to the network 20. For example, the computing devices can be directly coupled to the network 20 via a hardwired network connection or wirelessly coupled to the network 20 via wireless communication channel established between the computing device and a wireless access point that is coupled to the network 20.

Referring now to FIG. 2, one embodiment of a backup management system is illustrated. In this exemplary system, a backup management system 101 includes a backup system 102 that sets up and initiates a backup job 106 which also can refer to the software-based backup process initiated by the backup system 102. The backup system 102 can be implemented as a combination of hardware and software. The backup job 106 will run on a computing device, such as a machine 108, and backup data 109 is saved into a database, such as backup storage 111. For example, the backup data 109 can be saved into a backup memory 110 of backup storage 111. Various backup jobs of a computing device can be scheduled and initiated by the backup system 102, with each iteration of backup data stored into the database.

In order to monitor the performance of a backup job, the performance of each backup job is measured. In the exemplary system shown in FIG. 2, the backup management system 101 includes a surveillance monitor 103 that is configured to measure the performance of the backup jobs run on a computing device, including backup job 106. Once the backup job 106 is completed, the surveillance monitor 103 stores the measured data in a database on the backup management system, such as performance data database 104. Measured data regarding the performance of each backup job run by the backup system 102 is stored in the performance data database 104 by the surveillance monitor 103. The performance of subsequent backup jobs can be compared to previous backup performance to determine if there is a degradation in the performance of backup jobs run on a particular computing device.

For example, the backup job 106 can be the initial backup job performance on a device. A subsequent backup job 107 can be run by the backup system 102 and the surveillance monitor measured the performance of the subsequent backup job 107 and stored the measured data in the performance data database 104. The surveillance monitor compares the backup job performances of the initial backup job 102 and the subsequent backup job 107 using the measured data stored in the performance data database 104. It is noted that the backup jobs that are being compared can be any two or more backup jobs run on the computing device and do not need to include the initial backup job performed on the computing device.

Various techniques can be employed by the surveillance monitor 103 to determine if there is degradation in the performance of the backup jobs performed on the computing device.

In the event that the surveillance monitor 103 detects a degradation in performance of a backup based on the comparison of two or more sets of backup job performance data, the surveillance monitor 103 responds in a number of ways. In one embodiment, the surveillance monitor 103 notifies the user of the computing device of performance issue, with or without suggestions that can be taken to resolve the issue. In another embodiment, the surveillance monitor 103 can communicate with a resolution center 105 that is part of the backup management system 101. If the backup management system 101 has required resources and permissions from the user, the resolution center 105 can attempt to resolve the performance degradation issue independently and without user intervention. The surveillance monitor may or may not inform the user that the resolution center is attempting to resolve the issue. If the issue cannot be resolved independently, the surveillance monitor 103 can communicate that information to the user.

There are a variety of ways that a performance degradation issue can be solved. For example, a backup job can be moved to a different backup maintenance window or a conflict with another high CPU-load application can be resolved to allow the backup job to be performed before or after the conflicting application. These types of solutions can be achieved, for example, by the resolution center of the backup management system. In another example, storage can be replaced or a dedicated host or dedicated database for the computing device can be requested to address degradation issues. These types of solutions can be implemented by a user of the computing device when the user has been informed of the performance degradation by the backup management system. In one embodiment, the solutions are implemented automatically based on a script such as a ranking or priority order or based on solution implementability.

Figure 3:
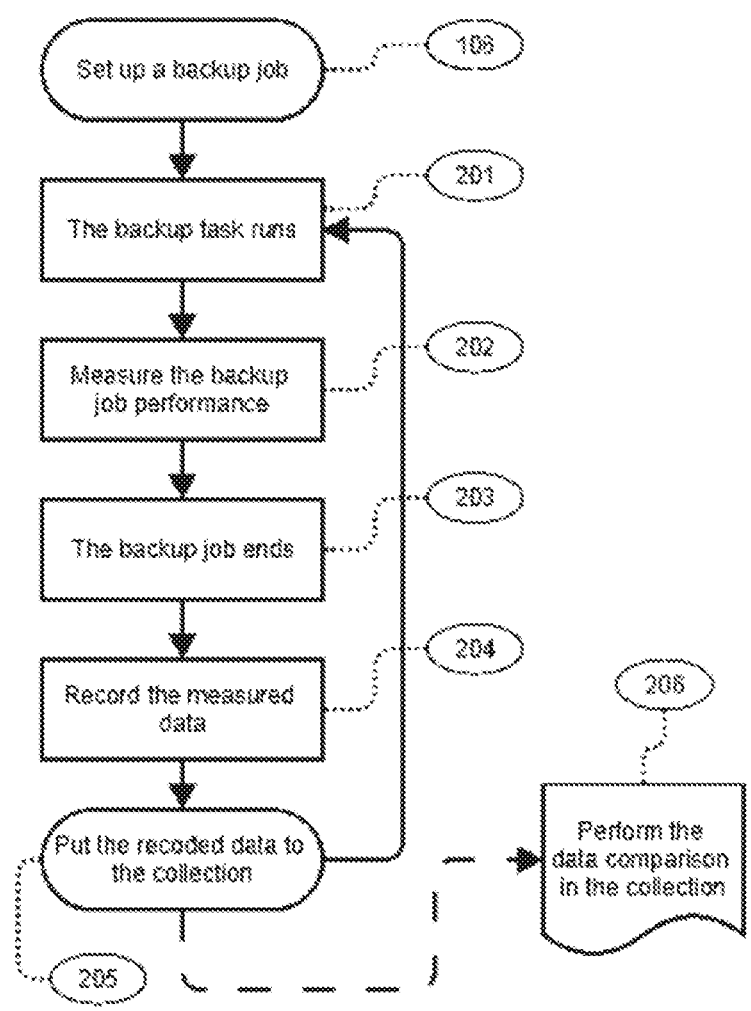
FIGS. 3-4 are a flowchart illustrating an example process for monitoring the performance of backup job.
Figure 4:
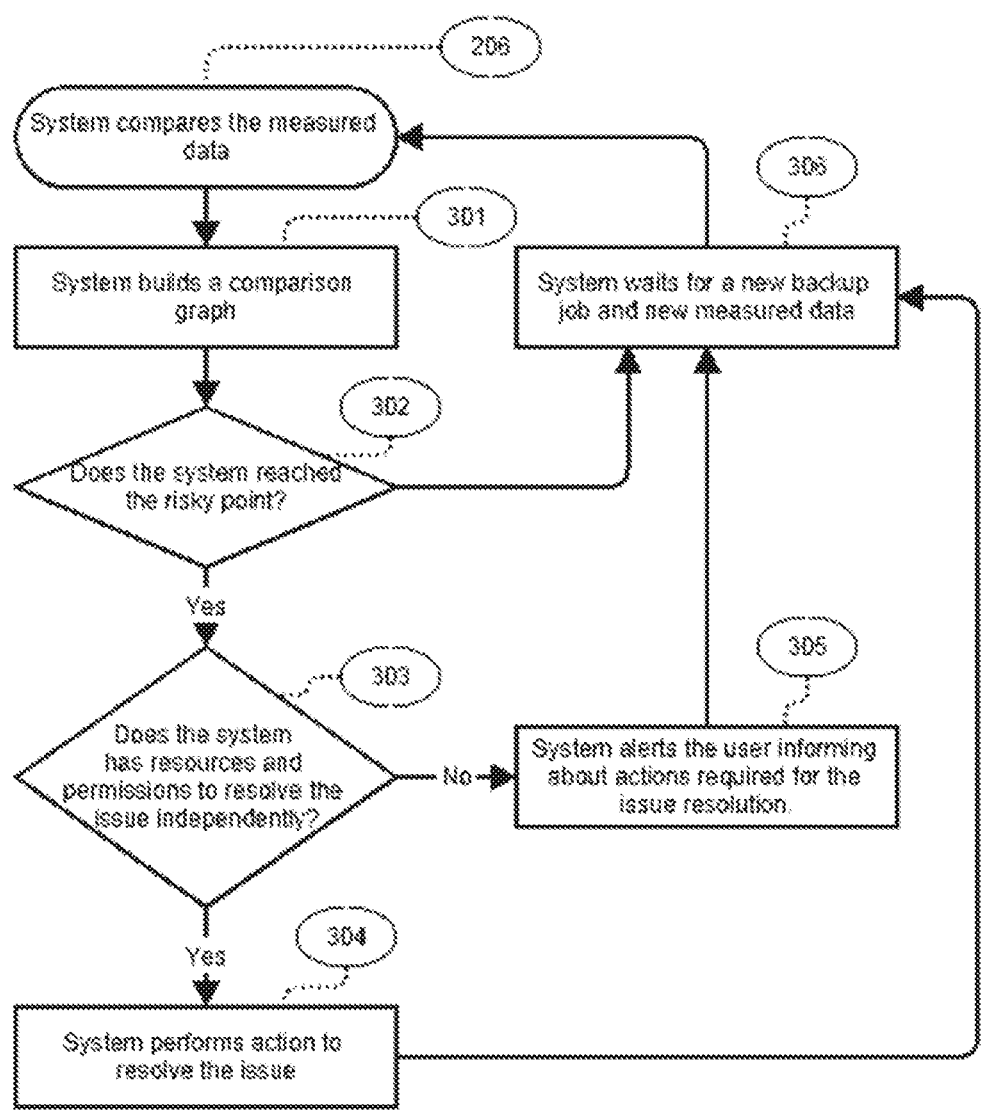

Referring now to FIGS. 3-4, an example of a process for monitoring backup performance is illustrated. A backup job is set up 106 by the backup system 102 and the backup job runs 201. While the backup job is running, the performance of the backup job is measured 202 by the surveillance monitor 104. The backup job ends 203 and the measured data is stored 204 by the surveillance monitor 104. The performance data is recorded 205 and a comparison is performed 206 to determine if there was a degradation of performance during the backup job.

In one exemplary embodiment illustrated in FIG. 3, the comparison of performance data is achieved by the surveillance monitor 104 building a comparison graph 301. Using the comparison graph, the surveillance monitor 104 determines if the performance of the backup job has reached a risky or unstable point 302. If the risky/unstable point is not reached, a new backup job can be performed during which new measured data will be collected 306. If the risky point is reached, the system determines if adequate resources exist to resolve the issue independently 303. If the resources exist, the resolution center will perform the necessary actions to resolve the issue 304. If the resources do not exist, the system alerts the user about the performance degradation issue and/or about the actions needed to resolve the issue 305.

The location to which the backup data is written can be important depending on the characteristics of the system. A backup plan, referring to a set of rules that specify how data will be protected on a machine, including what data to include in the backup and where the backup data will be stored, is often created for a computing system. A centralized backup plan can be utilized and is one in which the backup plan is deployed to a managed machine, such as a computing device that includes a backup agent, from a management server. The management server can be a central server that drives data protection within the enterprise network.

When a centralized backup plan is created, only the same backup location or a simple template can be specified for storing data from the backups of each computing device. As a result, there is no ability to customize the path where the backup data should be stored in some embodiments. As a result, backups are usually stored in a single place in the system. When it is necessary to place backup data in a different location depending, for example, on management machine properties or the current date, it cannot be done by a simple backup plan reconfiguration. It is possible to use a script that will move the backup data from the single location after the backup data has been stored therein, but this requires additional processing and resource consumption.

In view of the forgoing, there is a need for a system in which the location of backup data storage can be selected for each computing device for each set of backup data. In one exemplary embodiment, the backup management system as discussed above can include functionality to allow a destination path to be determined for the data produced by a backup process performed on a computing device.

In order to allow a user to designate the location for storage of the backup data from one or more computing devices in a system, a path definition script can be defined and run on a source machine before a backup job occurs. The path definition script is configured to return a path where the backup data will be stored. This allows the location for storing backup data from each computing device and each backup job to be specified for each backup job instead of storing the backup data in static location. The script is executed on the local machine before the backup job and thus can use current information, including but not limited to the date or current machine properties such as machine name or IP address, to define the path where backup data is written.

The path definition script, which is used for path customization, can be written in any language. The script runs on the computing device and is used to calculate a destination path and provide it to the backup application. A variety of criteria can be used in determining the destination path. For example, the path can be calculated based on the current date, the machine name, the machine IP, the machine subnet, the machine domain membership, and/or the machine OS type.

There are a variety of ways to communicate the path to the backup application. For example, the path can be sent to a standard output that communicates with the backup application.

Figure 5:
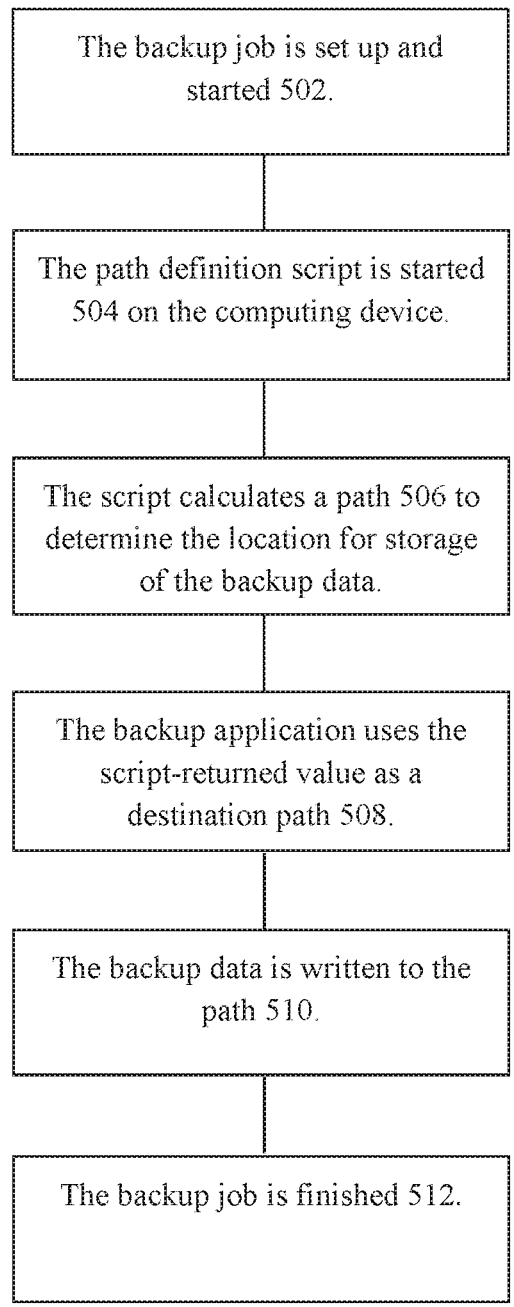
FIG. 5 is a flowchart illustrating an example process for designation a backup data storage location.

Referring now to FIG. 5, an example of a process for designating the backup data storage location is illustrated. The backup job is set up and started 502. While the backup is running the path definition script is started 504 on the computing device. The script calculates a path 506 to determine the location for storage of the backup data produced by the backup job. The backup application uses the script-returned value as a destination path 508. The backup data is written to the path 510 as calculated by the path definition script, and the backup job is finished 512.

It is noted that the system described herein can also be used for various other tasks that utilize computing device resources. For example, the system can be used for replication of a system backup, replication of system resources, system maintenance operations, or choosing a job executor for load balancing for external requests.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures.

As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation.

A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus.

The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A backup performance system for a surveillance and load distribution application comprising:
a plurality of computing devices, wherein each computing device of the plurality of computing devices is configured to execute a plurality of backup jobs for saving data to one or more backup storage systems; and
a backup management system in electronic communication with the plurality of computing devices and configured to set up each respective plurality of backup jobs run on each of the plurality of computing devices,
the backup management system comprising a resolution center and a surveillance monitor configured to measure and compare performance data of each respective plurality of backup jobs run on each of the plurality of computing devices for the detection and correction of a performance degradation, wherein the surveillance monitor determines if performance of a current backup job has reached an unstable point based on the compared performance data, wherein if the unstable point is reached, the backup management system determines required resources and permissions exist, the resolution center will attempt to resolve the performance degradation without user intervention, and wherein, if the resolution center is unable to resolve the performance degradation, the surveillance monitor will communicate information about the performance degradation to a user.

2. The backup performance system of claim 1, wherein the performance data is stored in a database in the backup management system.

3. The backup performance system of claim 1, wherein the surveillance monitor measures performance of an initial backup job and stores the measured performance data from the initial backup job to a performance database.

4. The backup performance system of claim 3, wherein the surveillance monitor measures performance data of a subsequent backup job and compares the measured performance data of the subsequent backup job to the measured performance data of the initial backup job.

5. The backup performance system of claim 4, wherein the surveillance monitor communicates with a resolution center if the surveillance monitor detects a performance degradation between the measured performance data of the initial backup job and the measured performance data of the subsequent backup job.

6. The backup performance system of claim 5, wherein the surveillance monitor detects a performance degradation when the time to complete the subsequent backup job compared to the time to complete the initial backup job is greater than a predetermined threshold.

7. The backup performance system of claim 1, wherein a location for storing backup data from each computing device and each backup job is specified using the backup management system.

8. The backup performance system of claim 6, wherein the resolution center is configured to notify a user of the computing device of the performance degradation.

9. The backup performance system of claim 1, further comprising a path definition script that is run on each of the plurality of computing devices before each backup job is run, wherein the path definition script defines a location for storing backup data from each of the plurality of computing devices and each backup job.

10. A method for backup performance surveillance, the method comprising:
executing a plurality of backup jobs of a computing device and storing backup data in a database for each backup job:
measuring performance of each of the plurality of the backup jobs, using a surveillance monitor, and storing performance data regarding the backup job in a performance database;
comparing performance data from a current backup job to performance data of a previous backup job in order to detect a degradation in performance of the current backup job;
determining if the performance of the current backup job has reached an unstable point and the degradation in performance will or has occurred based on the comparing;
determining if required resources and permissions exist to attempt to resolve the degradation in performance of the current backup job;
if the required resources and permissions exist, attempting to resolve, using an automated resolution center, the degradation in performance without user intervention; and
if automated resolution center is unable to resolve the degradation, communicating information about the degradation to a user, wherein a location for storing backup data from each computing device and each backup job of the plurality of backup jobs is specified using a backup management system.

11. The method of claim 10, further comprising
communicating with a resolution center if the surveillance monitor detects a performance degradation between an initial backup job performance data and a subsequent backup job performance data.

12. The method of claim 11, wherein the performance degradation is detected when the time to complete the subsequent backup job compared to the time to complete the initial backup job is greater than a predetermined threshold.

13. The method of claim 10, further comprising running a path definition script on the computing device before the backup job is run, wherein the path definition script defines a location for storing backup data from the computing device and the current backup job.

14. The method of claim 10, wherein surveillance monitor measures performance of an initial backup job and stores performance data from the initial backup job to a performance database.

* * * * *